United States Patent [19]

Steffancin

[11] 4,117,034
[45] Sep. 26, 1978

[54] AMORPHOUS POLYESTER GRAFT POLYMER ALLOYS

[75] Inventor: William Steffancin, Belpre, Ohio

[73] Assignee: Borg-Warner Corporation, Chicago, Ill.

[21] Appl. No.: 769,988

[22] Filed: Feb. 18, 1977

Related U.S. Application Data

[63] Continuation of Ser. No. 603,846, Aug. 11, 1975, abandoned.

[51] Int. Cl.$^2$ .............................................. C08L 67/06
[52] U.S. Cl. ..................................................... 260/873
[58] Field of Search ......................................... 260/873

[56] References Cited

U.S. PATENT DOCUMENTS

| | | | |
|---|---|---|---|
| 3,238,275 | 3/1966 | Calvert | 260/880 R |
| 3,564,077 | 2/1971 | Brinkmann et al. | 260/873 |
| 3,644,574 | 2/1972 | Jackson, Jr. et al. | 260/873 |
| 3,657,391 | 4/1972 | Curfman | 260/876 R |
| 3,671,610 | 6/1972 | Amagi et al. | 260/880 R |
| 3,758,640 | 9/1973 | Thorpe | 260/873 |
| 3,852,376 | 12/1974 | Bando et al. | 260/862 |
| 3,904,707 | 9/1975 | Gebhart et al. | 260/873 |
| 3,919,353 | 11/1975 | Castelnuovo et al. | 260/873 |
| 3,959,062 | 5/1976 | Hoh et al. | 260/873 X |
| 3,969,294 | 7/1976 | Papouchado | 260/873 X |

FOREIGN PATENT DOCUMENTS 97,081/74 9/1974 Japan.
1,409,275 10/1975 United Kingdom.

Primary Examiner—J. Ziegler
Attorney, Agent, or Firm—Richard J. Schlott

[57] ABSTRACT

Alloys of amorphous copolyesters with graft polymers of styrene-methyl methacrylate, styrene-methyl methacrylate-acrylonitrile or styrene-acrylonitrile on diene rubber substrates exhibit synergistic enhancement of impact properties in the range of 5 to 40% by weight graft polymer. Notched Izod impacts above 10 ft lbs/in notch result in the range where the synergistic effect occurs.

7 Claims, No Drawings

AMORPHOUS POLYESTER GRAFT POLYMER ALLOYS

This is a continuation of application Ser. No. 603,846 filed Aug. 11, 1975, now abandoned.

BACKGROUND OF THE INVENTION

This invention relates to polyester alloy compositions having unexpectedly high impact strengths. More particularly, the invention relates to moldable polyester alloys comprising blends of amorphous polyesters with graft polymers which exhibit unexpected improvement in impact properties. The amorphous polyesters are the copolyesters of aromatic dicarboxylic acids and of aliphatic diols and include copoly(1,4-cyclohexylene dimethylene iso/terephthalate) (PCDT) and the like, and the graft polymers are polymers of a vinyl aromatic hydrocarbon, an alkylacrylate and, optionally, an acrylonitrile prepared in the presence of a rubbery diene substrate.

Aromatic polyesters of aliphatic diols are widely used as molding plastics, however they generally exhibit low impact properties, and high notch sensitivity limits their use. Prior art efforts to overcome these limitations have met with only moderate success. For example, in U.S. Pat. No. 3,644,574, blends of poly(tetramethylene terephthalate) (PTMT) with polystyrene or copolymers having greater than 50% styrene content are disclosed which exhibit modest improvement in impact properties. This technique succeeded only with PTMT, and no improvement of impact properties was obtained for blends with poly(ethylene terephthalate) or poly(trimethylene terephthalate). In U.S. Pat. No. 3,564,077, moderate impact improvement was effected in poly(ethylene terephthalate) when small amounts, generally less than 10% by weight, of styrene-butadiene copolymers were blended therewith. In general, these and other prior art methods have not produced moldable polyesters having the extremely high impact necessary for use as engineering thermoplastic materials.

SUMMARY OF THE INVENTION

It has now been found that the addition of certain graft polymers to amorphous aromatic polyesters of aliphatic diols results in a remarkable and unexpected improvement in impact strength and a concomitant reduction in notch sensitivity. More particularly, the addition of certain graft copolymers to amorphous polyesters produces alloys having synergistic improvement in impact properties when the graft polymer component is present in a narrow weight range, based on the total composition.

DETAILED DESCRIPTION

The amorphous polyesters, i.e. those copolyesters which are essentially non-crystalline, which are useful for the purposes of the present invention are the widely available amorphous copolyesters derived from aromatic dicarboxylic acids and aliphatic diols, and include the phthalate copolyesters of aliphatic diols having three or more carbon atoms, such as copoly(1,4-cyclohexylene dimethylene iso/terephthalate) PCDT, and the like. The copolyesters are prepared by conventional techniques, such as by ester interchange of the glycol and a dialkyl ester of the dicarboxylic acid, or by esterification of the glycol and the dicarboxylic acid. Homopolyesters are prepared from a single glycol and a single dicarboxylic monomer, whereas the instant amorphous copolymers are prepared from mixtures of glycols and/or dicarboxylic monomers.

The homopolyesters, in particular poly(ethylene terephthalate) and poly(tetramethylene terephthalate) are highly crystalline materials which exhibit a crystalline melting point. The amorphous copolyesters useful for the purposes of this invention are deliberately prepared to prevent more than moderate amounts of crystallization. Thus the high melt temperatures associated with high crystallinity are avoided and they are rendered more readily processable.

The graft polymers useful for the purposes of this invention are those prepared by polymerizing a vinylaromatic monomer and at least one monomer selected from the group consisting of acrylic ester monomers and acrylonitrile monomers in the presence of a polydiene rubber or diene-styrene copolymer rubber containing up to 35% styrene. Typical methods for preparing a graft polymer from a vinylaromatic monomer and an acrylate monomer are found in U.S. Pat. No. 3,671,610, and methods for preparing graft polymers from a vinylaromatic monomer, an acrylate monomer and an acrylonitrile monomer are found in U.S. Pat. No. 3,657,391. Methods for preparing graft polymers from styrene and acrylonitrile are found in U.S. Pat. No. 3,238,275.

Generally the rubber component of the graft polymer will comprise from about 40% to about 90% by weight of the total graft polymer, and preferably will be a rubber selected from polybutadiene and butadiene-styrene copolymer rubbers containing up to 35% styrene. The grafting monomer components will comprise from 10% to about 60% of the total compositions. The vinylaromatic monomer may be styrene, alpha-methylstyrene, an alkylstyrene or a mixture thereof, the acrylic ester monomer may be methyl acrylate, ethyl acrylate, methyl methacrylate or a mixture thereof, and the acrylonitrile monomer may be acrylonitrile, methacrylonitrile or a mixture thereof. The preferred grafting monomer component will be a mixture selected from styrene-methyl methacrylate, styrene-methyl methacrylate-acrylonitrile and styrene-acrylonitrile. It will be understood that minor amounts of a crosslinking monomer such as divinyl-benzene, ethylene glycol dimethacrylate or the like may also be included in the preparation of these graft polymers.

The polyester graft polymer alloys of this invention are prepared by any of the conventional blend techniques including mechanical mixing of the components in pellet or powder form, by blending on hot rolls, or by melt-mixing in a Banbury mixer or through extrusion. The alloys will comprise from about 95% by weight to about 60% by weight polyester and correspondingly from about 5% to about 40% by weight graft polymer. Below and above this narrow range, the synergistic effect is diminished and impact properties markedly decrease with further increase in graft polymer content. Within the preferred range the amount of graft polymer component effective to produce synergistic enhancement of impact properties will vary somewhat with the particular polyester, with changes in the rubber content and particle size and with the particular graft monomers employed in the graft polymer. The alloys may be further compounded to contain antioxidants, stabilizers, lubricants, fillers, plasticizers, pigments, flame retardants, foaming agents and the like, which are added thereto in accordance with conventional procedures well known to those skilled in the art.

The invention will be better understood by consideration of the following examples which are provided by way of illustration of the instant invention and are not intended to further limit the scope thereof.

DETAILED EMBODIMENTS

The Graft Polymers

The methyl methacrylate-butadiene-styrene (MBS) graft polymer was prepared by polymerizing a mixture of 18 parts by weight methyl methacrylate and 17 parts by weight styrene in the presence of a butadiene-styrene (1:3) copolymer rubber in the manner taught by Example 1 of U.S. Pat. No. 3,671,610.

The Alloys

Alloys were prepared by first melt-mixing in a Banbury mixer, the polyester and graft polymer in the indicated ratios at 180° C. Magnesium stearate (1 part by weight) was included as a processing aid. The mixture was transferred to a two-roll mill at 150–160° C. for further milling. The blend was then sheeted from the mill, cooled and granulated.

The granules were dried in an oven at 85° C. for four hours to remove moisture, then injection molded on a 1 oz. Van Dorn injection molding machine to produce ⅛ inch thick test bars for property measurements.

Blends for control purposes were prepared in substantially the same way.

TABLE I.

| | Alloys with Copoly(1,4-cyclohexylenedimethylene iso/terephthalate) (PCDT) | | | | | | | | | | | | | | |
|---|---|---|---|---|---|---|---|---|---|---|---|---|---|---|---|
| Example No. | 1 | 2 | 3 | 4 | 5 | 6 | 7 | 8 | 9 | 10 | 11 | 12 | 13 | 14 | 15 |
| Components:[1] | | | | | | | | | | | | | | 75 | |
| PCDT[2] pbw | 100 | 80 | 75 | 50 | 95 | 90 | 75 | 50 | 25 | 95 | 90 | 80 | 90 | 95 | 50 |
| MBS[3] pbw | — | 20 | 25 | 50 | — | — | — | — | — | — | — | — | — | — | — |
| MABS-I[4] pbw | — | — | — | — | 5 | 10 | 25 | 50 | 75 | — | — | — | — | — | — |
| ABS-I[5] pbw | — | — | — | — | — | — | — | — | — | 5 | 10 | 20 | — | — | — |
| ABS-II[6] pbw | — | — | — | — | — | — | — | — | — | — | — | — | 10 | 25 | 50 |
| Properties:[7] | | | | | | | | | | | | | | | |
| Tensile Str. (psi) | 7400 | — | 4800 | 3400 | 6400 | 6100 | 4900 | 3400 | 2400 | 5600 | 4550 | 4125 | 6500 | 5450 | 4120 |
| Elongation (%) | 420 | — | 360 | 280 | 330 | 390 | 280 | 260 | 220 | 750 | 750 | 750 | 220 | 260 | 170 |
| Tensile Mod. (psi × 10⁻⁵) | 2.9 | — | 1.9 | 1.4 | 2.4 | 2.3 | 1.9 | 1.6 | 1.2 | 2.3 | 2.0 | 1.9 | 2.7 | 2.4 | 2.1 |
| Izod impact (ft. lbs/in notch) | 0.7 | 18.4 | 10.3 | 3.3 | 1.0 | 2.0 | 17.1 | 9.2 | 6.4 | N.B.[8] | N.B.[8] | N.B.[8] | 1.7 | 15.9 | 9.5 |

Notes:
1. All blends contain 1 pbw magnesium stearate.
2. PCDT is copoly(1,4-cyclohexylenedimethylene iso/terephthalate) obtained as Tenite brand polyphthalate 7DRO from Eastman Chemical Company.
3. MBS is a graft polymer containing 18% methyl methacrylate, 17% styrene and 65% butadiene-styrene (3:1) rubber.
4. MABS-I is a graft polymer containing 20.6% methyl methacrylate, 18.7% styrene, 3.7% acrylonitrile and 57% butadiene-styrene (3:1) rubber.
5. ABS-I is a graft polymer containing 18.75% styrene, 6.25 acrylonitrile and 75 butadiene rubber.
6. ABS-II is a graft polymer containing 17.85% acrylonitrile, 32.15% styrene and 50 pbw butadiene rubber.
7. Properties measured at 73° F.
8. N.B.=Sample is ductile; bends without breaking in test.

The methyl methacrylate-acrylonitrile-butadiene-styrene (MABS) graft polymers were prepared by polymerizing amounts indicated in the Examples of methyl methacrylate, acrylonitrile, and styrene in the presence of a polybutadiene latex substantially as set forth in U.S. Pat. No. 3,657,391.

A high rubber acrylonitrile-styrene-butadiene (ABS) graft polymer was prepared by polymerizing 6.25 pbw acrylonitrile and 18.75 pbw styrene in the presence of a 75 pbw (solids basis) of pre-formed polybutadiene latex, substantially by the method disclosed in U.S. Pat. No. 3,238,275. This material was designated ABS-I.

A second ABS having a lower rubber content was prepared by polymerizing 17.85 pbw acrylonitrile and 32.15 pbw styrene in the presence of 50 pbw (solids basis) of a polybutadiene rubber latex, substantially by the method disclosed in U.S. Pat. No. 3,238,275. This material was designated ABS-II.

A third ABS was prepared for control purposes by polymerizing 28.6 pbw acrylonitrile and 51.4 pbw styrene in the presence of 20 pbw (solids basis) of a polybutadiene rubber latex, substantially as taught in U.S. Pat. No. 3,238,275. This material was designated ABS-III.

The Polyesters

The poly(1,4-cyclohexylene dimethylene iso/terphthalate) (PCDT) employed was Tenite brand polyphthalate 7DRO, obtained from Eastman Chemical Company.

TABLE II.

| | Low Rubber Graft Polymer Blends | | | | | |
|---|---|---|---|---|---|---|
| Example Number | 16 | 17 | 18 | 19 | 20 | 21 |
| Component:[1] | | | | | | |
| PCDT[2] pbw | 75 | 50 | 25 | 75 | 50 | 25 |
| MASB-II[3] | 25 | 50 | 75 | — | — | — |
| ABS-III[4] | — | — | — | 35 | 50 | 75 |
| Izod Impact (ft lbs/in notch)[5] | 1.0 | 1.9 | 6.9 | 0.9 | 1.6 | 6.6 |

Notes:
1. All blends contain 1 pbw magnesium stearate.
2. See Note 2, TABLE I.
3. MABS-II is a graft polymer containing 40% methyl methacrylate, 30% styrene, 10% acrylonitrile and 20% butadiene-styrene (3:1) rubber.
ABS-III is a graft polymer containing 28.6% acrylonitrile, 51.4% styrene and 20% polybutadiene rubber.

The effect of the particular graft polymers employed for the purposes of this invention on impact properties is clearly synergistic. Thus, extremely high notched Izod impact values are realized for PCDT alloys having a graft polymer content in the range of 20–30% by weight (Examples 2, 7, 10–12 and 14) and the impact values decline for alloys containing substantially greater amounts of the graft polymer component. The optimum content, i.e. the content producing the greatest improvement in impact properties will vary somewhat for various polyesters and particular graft polymers; compare Examples 5 and 6 with Examples 10 and 11. Certain graft polymers, as in Examples 10 and 11, will produce a maximum in ductility even at very low levels (5%) of graft component. It will be understood that alloys containing amounts of graft polymer above and below the optimum value will also have usefully high impact properties.

It will be seen that this non-linear and unpredicted increase in impact properties is in part a function of the rubber content of the graft polymer. As shown in Table II, low rubber (20%) ABS and MABS resins impart only small improvements in impact, and the increases are essentially linear with rubber content, even in ranges where the graft polymer is the predominant component. Thus, the impact properties of the blends increase with increasing graft polymer component, and show no synergistically-enhanced impact property maximum.

The synergistic enhancement is also not seen when simple ungrafted rubbers are blended at low levels with amorphous polyesters.

Thus it will be seen that the instant invention is an alloy composition comprising an amorphous aromatic polyester and a graft polymer which exhibits unpredicted enhancement of impact properties. The graft polymers are graft polymer of styrene and methyl methacrylate, styrene methyl methacrylate and acrylonitrile or styrene and acrylonitrile on diene rubber substrates wherein the rubber component of the graft polymer is greater than 40%, preferably between 50% and 90% by weight, of the total graft polymer. The synergistic enhancement of impact properties will be seen to occur at a graft polymer level of between 5 and 40%, preferably between 10 and 30% by weight of the graft polymer-polyester alloy composition.

The alloy compositions of the present invention will be particularly useful where high impact properties are important, as in injection molded parts and in extruded profiles, film and sheet and in blow-molded containers. Particular applications may require a compromise in formulation whereby less than the maximum high impact properties result in order that other property levels such as, for example, tensile strength and flexural modulus charcteristics which may be necessary for the intended end use are maintained, and it will be understood that alloys which exhibit synergistically enhanced though not maximized impact properties are included within the scope of the invention. It will be further apparent that modifications of the instant invention whereby processing aids, stabilizers, fillers, pigments, colorants and the like may be included in the alloys, and such modifications are considered to be within the scope of the invention. The Examples herein are provided by way of illustration of specific embodiments of the invention and not be way of limitation and the scope thereof is solely defined by the appended claims.

I claim:

1. A thermoplastic alloy composition comprising an amorphous copolyester derived from $C_3$-$C_{10}$ alkylene glycols and phthalic acids and a synergistically effective amount of a graft polymer prepared by polymerizing from 10 to 60 parts by weight of a monomer mixture of at least two monomers selected from the group consisting of acrylic ester monomers, vinylaromatic monomers and acrylonitrile monomers in the presence of correspondingly from 90 to 40 parts by weight of a diene rubber whereby the thermoplastic alloy composition exhibits synergistically enhanced impact properties.

2. The thermoplastic alloy composition of claim 1 wherein the monomer mixture is selected from the group consisting of methyl methacrylate-styrene mixtures, methyl methacrylate-acrylonitrile-styrene mixtures and acrylonitrile styrene mixtures.

3. A thermoplastic alloy composition comprising from 95 to 60 percent by weight of an amorphous copolyester derived from $C_3$ - $C_{10}$ alkylene glycols and phthalic acids and correspondingly from 5 to 40 percent by weight of a graft polymer prepared by polymerizing from 10 to 60 parts by weight of a monomer mixture of at least two monomers selected from the group consisting of acrylic ester monomers, vinylaromatic monomers and acrylonitrile monomers in the presence of correspondingly from 90 to 40 parts be weight of a diene rubber.

4. The thermoplastic alloy composition of claim 1 wherein the monomer mixture is selected from the group consisting of methyl methacrylate-styrene mixtures, methyl methacrylate-acrylonitrile-styrene mixtures and acrylonitrile styrene mixtures.

5. A method for preparing a thermoplastic alloy composition having synergistically enhanced impact properties comprising providing an amorphous copolyester derived from $C_3$- $C_{10}$ alkylene glycols and phthalic acids and melt-mixing therewith an effective amount of a graft polymer prepared by polymerizing from 10 to 60 parts by weight of a monomer mixture of at least two monomers selected from the group consisting of acrylic ester monomers, vinylaromatic monomers and acrylonitrile monomers in the presence to correspondingly from 90 to 40 parts by weight of a diene rubber.

6. The method of claim 5 wherein the monomer mixture is selected from the group consisting of methyl methacrylatestyrene mixtures, methyl methacrylate-acrylonitrile-styrene mixtures and acrylonitrile-styrene mixtures.

7. The method of claim 5 wherein the diene rubber is selected from the group consisting of polybutadiene and rubbery styrene-butadiene copolymers.

* * * * *